UNITED STATES PATENT OFFICE 2,423,306

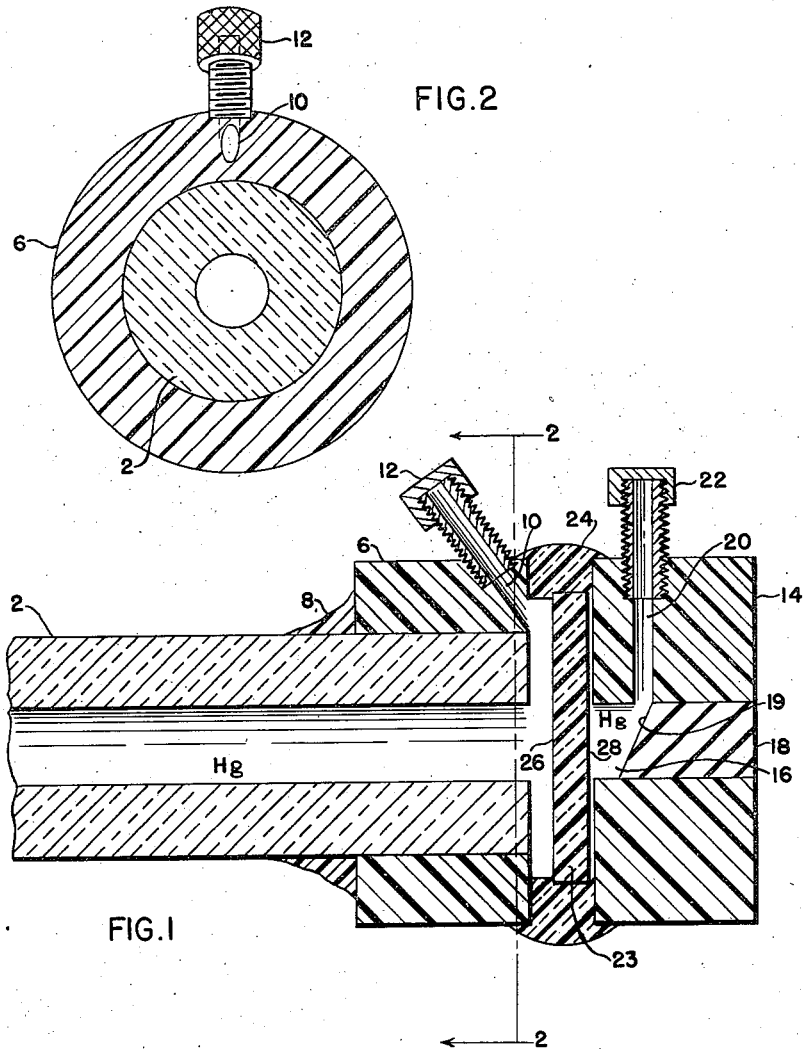

TRANSMISSION LINE

Gordon Donald Forbes, Sudbury, and Herbert Shapiro, Cambridge, Mass., assignors, by mesne assignments, to the United States of America, as represented by the Secretary of War Application August 1, 1945, Serial No. 608,310

5 Claims. (Cl. 178—44)

The present invention relates to a transmission line, and it relates more particularly to a transmission line which introduces a time delay to energy traveling in the line.

It is often desirable to delay electrical energy for a predetermined period of time, thus permitting a first pulse of energy to be compared readily with a second pulse of energy appearing a predetermined time later.

One means of introducing such a time delay, according to the present invention, makes use of an artificial transmission line having a delay characteristic. Such an artificial line may consist of a liquid medium confined between two high frequency piezoelectric crystals. In this case, the delay is produced by the cooperating action of the crystals and liquid. It is well known that when a piezoelectric crystal is electrically stressed, it is excited into mechanical vibration. The rate of vibration, in general, corresponds to the fundamental frequency or a harmonic frequency of the crystal, although the rate of vibration may be predetermined by the frequency of the applied electrical signal. Conversely, the crystal, when stressed mechanically, will produce on its surface, an electrical charge.

In operation a signal to be delayed is applied to one of the piezoelectric crystals (hereinafter called the transmitting crystal) thereby causing the crystal to vibrate at a high frequency, where said frequency may be in the order of 10 to 30 megacycles per second. As the crystal is in contact with the liquid, its vibrations are transmitted into the liquid medium as a compressional wave. This compressional wave then travels through the medium to the second piezoelectric crystal (hereinafter called the receiving crystal), and the time it takes for this wave to travel from the transmitting crystal to the receiving crystal is dependent upon the distance between the two crystals and the sonic characteristics of the medium. Upon the arrival of the compressional wave at the receiving crystal, a charge is induced thereon which is then detected and amplified by conventional means.

It is desirable that the signal obtained from the receiving crystal be of substantially the same form as the signal applied to the transmitting crystal and this, in a large measure, depends upon the impedance match between the crystals and the liquid medium. Other factors which affect that shape of the received signals are the amount of multiple reflections set up in the delay line, and the impedance of associated circuits.

It is therefore, an object of the present invention to provide a novel delay line wherein the impedance of the crystals is substantially matched to the impedance of the liquid medium so as to give proper signal reproduction.

It is a second object of the present invention to provide a means whereby a liquid filled cavity prevents or considerably attenuates multiply reflected signals in the transmission (delay) line.

Other objects and advantages will appear from the following description when taken into consideration with the accompanying drawings wherein Fig. 1 is a sectional view of one embodiment of the present invention, and Fig. 2 is a section through line 2—2 of Fig. 1.

As the transmitting and receiving ends of the line have similar characteristics and are identical in construction, only one end of the line is shown and described in detail.

Reference is made to Fig. 1, which shows one embodiment of the present invention. A hollow glass tube 2 contains a liquid medium which conducts the compressional wave transmitted (or received) by a piezoelectric crystal. Fitting closely over the glass tube at its end is a sleeve 6 made of a suitable insulating material such as "Bakelite," the end of the tube being substantially flush with the outer end of the sleeve. A dielectric sealing compound 8, which may consist of a resinous wax, seals sleeve 6 to the tube. A hole 10 extends through insulating sleeve 6, as shown, the longitudinal axis of said hole being angularly disposed with the axis of the sleeve. A portion of said hole may be threaded to accommodate a screw-type electrode 12. It is preferable that said electrode be tubular, and that the end of the electrode projecting into hole 10 be open, the external end of the electrode being closed.

An end closure 14 containing a cavity 16 is associated with the end of the tube 2. The geometry of cavity 16 may best be described by considering one mode of forming it. A hole having a cross-sectional area substantially equal to the cross-sectional area of the hollow portion of glass tube 2 and of the same general shape extends through the center of the closure. A plug 18 of the same cross-sectional area and shape as the hole, but of shorter length, is disposed within the hole as shown. The internal face 19 of plug 18 is inclined at a predetermined angle with respect to the plug axis. A radial hole 20 extends through the wall of the end closure and communicates with the above described cavity 16. A portion of this hole may be threaded to accommodate a screw-type electrode 22 which may be similar to previously described tubular electrode 12.

A piezoelectric quartz crystal 23 is cemented or otherwise suitably fastened to the inner face of the end closure in such a manner as to form a closure for cavity 16.

End closure 14 with the associated crystal 23 cemented thereto, and the glass tube 2 having associated sleeve 6 are disposed in such a manner that crystal 23 lies in plane substantially perpendicular to the axis of the tube and is spaced a predetermined distance from the end of the glass tube. The predetermined spacing is maintained constant by connecting end closure 14 to sleeve 6 by means of a resinous dielectric wax 24 which acts both as a mechanical bond between the end closure and sleeve, and as a sealing medium. It will be understood that there are other feasible means for providing such a mechanical connection.

Attention is again directed to the fact that a structure similar to that described above is disposed at the other end of hollow glass tube 2. Prior to inserting electrodes 12 and 22 into their respective holes 10 and 20, mercury (or other medium having suitable characteristics) is introduced through these holes to completely fill the hollow portion of glass tube 2 and the cavity 16 in end colsure 14. The corresponding cavity (not shown) at the other end of glass tube 2 is likewise filled with mercury. The two hollow screw electrodes 12 and 22 may then be inserted into the sleeve and end closure, respectively, to make electrical contact with the mercury. Mercury, in addition to possessing suitable acoustic properties, the characteristics of which are to be more fully described hereinafter, has an advantage of provinding a simple electrical connection to the oscillatory faces 26 and 28 of piezoelectric crystal 23. From the above description, it will be seen that the mercury in the hollow glass tube 2 is isolated electrically from the mercury contained in cavity 16.

Assuming that the structure shown in Fig. 1 is the transmitting end of the line, and crystal 23 is the transmitting crystal, the operation of a delay line will now be described. A signal, such as a pulse of electrical energy having a predetermined carrier frequency, or a video signal is applied to electrodes 12 and 22. The electrical oscillations are then transmitted through the mercury to the respective faces of the piezoelectric crystal 23. This causes said crystal to oscillate mechanically at a frequency substantially equal to said carrier frequency.

As oscillating face 26 of the crystal is in contact with the mercury filling the hollow glass tube, the oscillations are transformed into a compressional wave. This compressional wave is transmitted by the mercury to the receiving crystal (not shown) at the other end of the hollow tube. The compressional wave upon striking the receiving crystal stresses said crystal to produce an oscillatory voltage in accordance with the well known piezoelectric effect. As the receiving crystal is adapted to oscillate at a frequency equal to the frequency of the compressional wave, the electrical oscillations produced will be of the same frequency as the carrier frequency of the original pulse applied to the lectrodes 12 and 22. A delayed signal substantially similar to that applied to electrodes 12 and 22 is thus obtained at the corresponding terminals at the receiving end of the line.

Both faces (26 and 28) as well as the body of crystal 23 oscillate during the time of the applied signal pulse. At the end of pulse, the oscillations are quickly damped due to the presence of the mercury in contact with the faces. As will be described hereinafter, the acoustic impedance characteristics of the crystal and the mercury produce this desired damping effect. Such damping insures satisfactory correspondence in wave shape of the electrical and mechanical energy pulses.

During oscillation of the cavity closing face 28 of the crystal, a certain amount of energy is imparted to the mercury in cavity 16. This energy is in the form of a compressional wave similar to the wave set up in hollow tube 2. In order to prevent this energy from being reflected to cause distortion of the energy traveling in tube 2, the invention contemplates that cavity wall 19 be inclined with respect to the cavity axis. The effect of inclined wall 19 will now be described.

As mentioned, wall 19 is disposed at such an angle with the cavity axis that reflections from the wall which strike face 28 of the crystal impinge on said crystal at an angle greater than the critical angle of the crystal (angle above which the energy will be reflected, and below which the energy will be partially refracted and partially passed by the crystal). Thus, substantially all of the energy reflected by back wall 19 is again reflected by crystal face 28. After numerous reflections by crystal face 28 and reflecting wall 19, some of the energy will strike the crystal at an angle less than the critical angle and hence be refracted through the crystal, said energy being random in nature. Much of the energy refracted through the crystal strikes the walls of hollow glass tube 2 at an angle less than the critical angle, thereof, and hence is attenuated as it passes through the glass and finally reflects back from the outer wall of the hollow tube. Thus, after a series of such reflections, this undesirable signal is attenuated to such a degree that very little energy finally reaches the crystal at the other end of the tube. The critical angle may be readily determined for any two media. For example, if plug 18 is made of "Bakelite" and the transmitting medium is mercury, the critical angle $\theta$ is given by the following expression:

$$\theta = \sin^{-1} \frac{C_1}{C_2}$$

where $C_1$ is the ultrasonic velocity in mercury and $C_2$ is the ultrasonic velocity in "Bakelite."

It was heretofore stated that the crystals and the liquid medium should have a good impedance match. The impedance referred to is acoustic impedance. It was further stated that mercury had desirable acoustic properties for use in a delay line of the character described. The acoustic impedance of a medium is equal to the product of the velocity (V) of sound through the medium, and the density ($\rho$) of the medium. This may be written "Acoustic $Z = V\rho$."

In transferring the energy of an oscillating piezoelectric crystal to a transmitting medium, the acoustic impedance of the crystal and the medium is a consideration. For a maximum transfer of energy, the acoustic impedance of the crystal should equal the acoustic impedance of the medium. Thus, this requirement is analagous to the well known electrical case.

Assume that a piezoelectric crystal is placed in air and a pulse of electrical energy is applied thereto. The crystal then mechanically vibrates at a particular frequency as determined by the piezoelectric characteristics of the crystal. As the acoustic impedance of the crystal is far different than the acoustic impedance of air, only a small amount of the oscillatory energy is transferred to the air. The result is that the crystal continues to oscillate even after removal of the energizing pulse. The crystal in such an instance is said to have a high "Q."

If on the other hand the oscillating faces of the piezoelectric crystal are in contact with mercury, most of the oscillatory energy of the crystal is transferred to the mercury. This follows from the fact that the acoustic impedance of mercury is very nearly equal to that of a piezoelectric crystal. Thus if a pulse of electrical energy is applied to the crystal, the crystal will not continue to oscillate extensively upon removal of the pulse, but instead, the crystal oscillations will be quickly damped. In such an instance, the "Q" of the crystal is said to be low.

In view of the foregoing, it is evident that other liquids or substances other than mercury but which have similar acoustic impedances may be used as a transmitting medium. In such an instance, the angular disposition of back wall 19 may be determined by the medium used to insure that the energy reflected from the back wall is again reflected by the crystal as heretofore described.

One particular advantage of the delay line disclosed above is that the diameter of hollow tube 2 may be quite small, therefore, requiring only a small amount of mercury. As an example, the diameter of the hollow portion of said tube may be of the order of two millimeters (2 mm.). Although a delay line having a generally circular cross-section is shown in the drawing, it is understood that the line may have any desired cross-sectional shape.

It will be understood that various changes and modification may be made in the precise details of the invention described above and that the invention herein is to be taken as defined in the following claims.

We claim:

1. A delay type transmission line including a hollow tube, mercury within said tube, an end portion positioned at each end of said tube, said end portion including a sleeve sealed about said tube at the end thereof, a piezoelectric crystal spaced from the end of said tube, said crystal lying in a plane perpendicular to the tube axis, an end closure adapted to carry said crystal, said end closure being mechanically associated with said sleeve and electrically insulated therefrom, said end closure having a cavity formed therein substantially coaxial with the axis of said hollow tube, and normally open toward said tube, said cavity being closed by said crystal, the opposite wall being inclined with respect to said crystal and said cavity axis, mercury in said cavity, a pair of hollow terminals, one of said hollow terminals being associated with said sleeve and communicating with the space between said crystal and said tube end, the mercury in said tube being in sufficient amount to fill said space and extend into said hollow terminal, the other of said hollow terminals being associated with said end closure, said end closure having an aperture extending between said terminal and said cavity whereby the mercury in said cavity extends into said hollow terminal.

2. A delay type transmission line including a hollow tube, mercury within said tube, an end closure positioned at each end of said tube, said end closure having a cavity formed therein substantially coaxial with the axis of said hollow tube, one wall of said cavity being inclined with respect to the cavity axis, a piezo electric crystal positioned between said tube and said end closure, said crystal defining one wall of said cavity, said wall being opposite to said inclined wall, means for mechanically associating said end closure with said hollow tube in a manner whereby one face of said piezoelectric crystal is opposite the hollow portion of said tube, the plane of said face being substantially perpendicular to the tube axis, mercury in said cavity, means for electrically insulating the mercury in said cavity from the mercury in said hollow tube, a pair of terminals for each end of said tube, a first terminal of each pair electrically connected to the mercury in said cavity, the second terminal of each pair electrically connected to the mercury in said hollow tube.

3. In a delay type transmission line including a hollow tube, mercury in said tube, an end portion positioned at each end of said tube, a piezoelectric crystal carried by each end portion and spaced from the end of said tube, a cavity formed in said end portion and open toward said tube, said open ended cavity being closed by one face of said crystal, the opposite wall of said cavity being angularly disposed with respect to said crystal face, mercury in said cavity, means for electrically insulating the mercury in said cavity from the mercury in said hollow tube, means at each end of the line for forming a first electrical contact to the mercury in said cavity, and means for forming a second electrical contact to the mercury in said hollow tube.

4. A delay type transmission line including a hollow tube, a medium in said tube, the acoustic impedance of said medium being substantially equal to the acoustic impedance of a piezoelectric crystal, an end portion disposed in spaced relationship with each end of said tube, means for mechanically associating said end portion with said tube, a cavity formed in each of said end portions and open toward said tube, a piezoelectric crystal carried by each of said end portions, one face of said crystals forming one wall of said cavities, the opposite wall of said cavity being angularly disposed to said crystal face, the other face of said crystal being in contact with the medium in said tube, a medium in said cavity having an acoustic impedance substantially equal to the acoustic impedance of said piezoelectric crystal, said medium being electrically insulated from the medium in said tube, means for making electrical contact with the crystal face contiguous with the medium in said cavity, and means for making an electrical contact with the crystal face contiguous with the medium in said tube.

5. A delay line comprising a hollow tube formed of dielectric material, means to mount a piezoelectric crystal perpendicularly to said tube at either end thereof and in spaced relationship therewith, said means including dielectric supports, a transmission medium filling said tube and the spaces between said tube and the inner faces of said crystals, and medium comprising a transmitting material having an acoustic impedance substantially equal to the acoustic impedance of said crystals, dielectric end means spaced from the outer faces of said crystals and carried by said dielectric supports, each of said means including a cavity coaxial with said tube and said crystals and open toward said crystals, the wall of said cavities opposite said crystals being inclined with respect to said crystals, a transmission medium filling said cavities and the spaces between said end means and said crystals, said medium comprising a material having an acoustic impedance substantially equal to the acoustic impedance of said crystals, and means adjacent said crystals to excite said crystals, said means comprising terminals electrically connected to the transmission mediums in said cavities and in said tube.

GORDON DONALD FORBES.
HERBERT SHAPIRO.

REFERENCES CITED

The following references are of record in the file of this patent:

UNITED STATES PATENTS

| Number | Name | Date |
|---|---|---|
| 2,407,294 | Shockley et al. | Sept. 10, 1946 |
| 2,263,902 | Percival | Nov. 25, 1941 |